United States Patent
Chen

(10) Patent No.: US 10,014,787 B2
(45) Date of Patent: Jul. 3, 2018

(54) SWITCHING POWER SUPPLY WITH INPUT VOLTAGE DETECTION AT THE SWITCHING NODE

(71) Applicant: FUJI ELECTRIC CO., LTD., Kawasaki-shi, Kanagawa (JP)

(72) Inventor: Jian Chen, Matsumoto (JP)

(73) Assignee: FUJI ELECTRIC CO., LTD., Kawasaki-Shi, Kanagawa (JP)

( * ) Notice: Subject to any disclaimer, the term of this patent is extended or adjusted under 35 U.S.C. 154(b) by 0 days.

(21) Appl. No.: 15/468,316

(22) Filed: Mar. 24, 2017

(65) Prior Publication Data

US 2017/0331384 A1    Nov. 16, 2017

(30) Foreign Application Priority Data

May 10, 2016  (JP) ................. 2016-094717

(51) Int. Cl.
*H02M 3/335* (2006.01)
*H02M 1/08* (2006.01)
*H02M 1/00* (2006.01)

(52) U.S. Cl.
CPC ......... *H02M 3/33569* (2013.01); *H02M 1/08* (2013.01); *H02M 2001/0022* (2013.01); *H02M 2001/0025* (2013.01)

(58) Field of Classification Search
CPC ........... H02M 1/0022; H02M 3/33569; H02M 3/33538; H02M 3/33546; H02M 3/33553; H02M 2001/0022
See application file for complete search history.

(56) References Cited

U.S. PATENT DOCUMENTS

| 2012/0033457 | A1* | 2/2012 | Kim .................. H02M 3/33553 363/21.04 |
| 2013/0002221 | A1* | 1/2013 | Wang .................... H02M 3/158 323/283 |
| 2013/0108303 | A1  | 5/2013 | Samejima et al. |
| 2014/0159680 | A1* | 6/2014 | Chiu ....................... G05F 1/468 323/271 |
| 2014/0286056 | A1* | 9/2014 | Yoon ................. H02M 3/33569 363/21.03 |
| 2014/0376275 | A1* | 12/2014 | Ohashi .................... H02M 1/38 363/21.02 |

FOREIGN PATENT DOCUMENTS

| JP | H09-117144 A | 5/1997 |
| JP | 2000-069750 A | 3/2000 |
| JP | 2013-099110 A | 5/2013 |
| JP | 2015-177595 A | 10/2015 |

\* cited by examiner

*Primary Examiner* — Harry Behm
(74) *Attorney, Agent, or Firm* — Rabin & Berdo, P.C.

(57) ABSTRACT

A control IC includes a VS voltage detection circuit that indirectly detects input voltage, by utilizing a fact that a voltage of a VS terminal of a reference potential of a high side drive circuit changes to a voltage equivalent to the input voltage when a high side drive signal is output from a control circuit to cause the high side drive circuit to turn on a high side switching element. The VS voltage detection circuit determines the level of the input voltage by sampling the VS terminal voltage at a time point that is delayed by a predetermined time from a rising edge of the high side drive signal, and supplies the determined level to the control circuit.

4 Claims, 6 Drawing Sheets

SWITCHING POWER SUPPLY WITH INPUT VOLTAGE DETECTION AT THE SWITCHING NODE

CROSS-REFERENCE TO RELATED APPLICATION

This application is based upon and claims the benefit of priority of the prior Japanese Patent Application No. 2016-094717, filed on May 10, 2016, the entire contents of which are incorporated herein by reference.

BACKGROUND OF THE INVENTION

1. Field of the Invention

The embodiments discussed herein relate to a switching power supply device.

2. Background of the Related Art

A switching power supply device that includes a current resonance DC-DC switching converter is suitable to improve its efficiency and to reduce its thickness and thus is employed widely in power supply adapters of televisions and the like. In the current resonance DC-DC switching converter, direct-current voltage obtained by rectifying and smoothing a commercial alternate-current power supply is used as input voltage. In this case, a smoothing capacitor is charged only when the voltage of the alternate-current power supply is high enough to exceed the terminal voltage of the smoothing capacitor, and thus the waveform of input current largely deviates from a sine wave. In this case, as a voltage waveform and a current waveform of alternate current differ from each other, not only the power factor decreases, but a high-frequency current component is generated and becomes a high-frequency noise source. Hence, the switching power supply device includes a power factor correction (PFC) circuit, so that direct-current voltage with less high-frequency noise is used as the input voltage of the current resonance DC-DC switching converter.

The switching power supply device detects this direct-current input voltage and uses the input voltage in various ways. For example, the input voltage is detected to determine whether the commercial alternate-current power supply is a 100 volt system or a 200 volt system. This determination result is used to optimize a detection threshold value of an overcurrent protection circuit, for example. That is, when the commercial alternate-current power supply is a 200 volt system and electric power to be protected is the same, the detection threshold value of overcurrent is set to an approximately half of the detection threshold value set for the 100 volt system.

The input voltage of the current resonance DC-DC switching converter is detected by using a voltage dividing circuit with resistors (for example, refer to Japanese Laid-open Patent Publication No. 9-117144 (paragraph [0032] and FIG. 1)). When the input voltage is detected by using the voltage dividing circuit with the resistors, the electric current always flows through the voltage dividing circuit, and thus detection loss is large, causing deterioration of standby electric power when a load is very small.

To solve this, there is a known configuration for detecting voltage output by a switching element of a current resonance DC-DC switching converter as input voltage (for example, refer to Japanese Laid-open Patent Publication No. 2013-99110 (paragraph [0027] and FIG. 1)). In this Japanese Laid-open Patent Publication No. 2013-99110, when a high side switching element 106 of serially connected switching elements turns on, the voltage of a primary smoothing capacitor 105 is supplied to a series circuit of a resonance reactor and a resonance capacitor 108 and is utilized to detect the input voltage. Specifically, a peak voltage detection circuit (a part of a voltage detection circuit 200) that includes a series circuit of a first resistor 202, a diode 201, and a second resistor 209, and a capacitor 204 connected in parallel with the second resistor 209 is connected to a connection point between the high side switching element and a low side switching element. Terminal voltage of the capacitor 204 of the peak voltage detection circuit is input into a power supply controlling integrated circuit (IC) 110, so that the power supply controlling IC 110 indirectly detects the input voltage (the voltage of the primary smoothing capacitor 105). Electric current flows through the peak voltage detection circuit only when the high side switching element is turned on by the diode 201. Hence, if the high side and low side switching elements perform switching operation with the same ON time ratio (i.e., 50%), electric power consumption is reduced to half as compared with a case in which electric current always flows.

The peak voltage detection circuit described in Japanese Laid-open Patent Publication No. 2013-99110 is configured to hold the voltage of the primary smoothing capacitor when the high side switching element turns on and to cause the power supply controlling IC to detect the held voltage. Hence, the peak voltage detection circuit needs to be arranged outside the power supply controlling IC, thereby increasing the cost for the arrangement. In addition, the power supply controlling IC needs a dedicated input terminal for inputting the held voltage, thereby increasing the cost of the power supply controlling IC. Also, the peak voltage detection circuit is configured to hold peak voltage, and thus its time constant is large, deteriorating input-voltage detection responsiveness. For example, when the input voltage suddenly changes, the input voltage needs to be detected immediately in order to protect the switching power supply device, but a power supply protection function can be disabled when the input-voltage detection responsiveness deteriorates.

SUMMARY OF THE INVENTION

According to one aspect, there is provided a switching power supply device including a high side first switching element and a low side second switching element that are connected in series and have both ends to which direct-current input voltage is applied, a series circuit of a resonance reactor and a resonance capacitor connected in parallel with the first switching element or the second switching element, and a control unit that performs on/off control to turn on and off the first switching element and the second switching element alternatingly. The control unit includes an input voltage detection circuit for detecting voltage that is output to a common connection point between the first switching element and the second switching element as the input voltage during a period when the first switching element is controlled to be turned on.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

In the following, embodiments will be described in detail with reference to the drawings. Note that each embodiment may be carried out by combining parts of a plurality of embodiments without inconsistency.

<First Embodiment>

Figure 1:
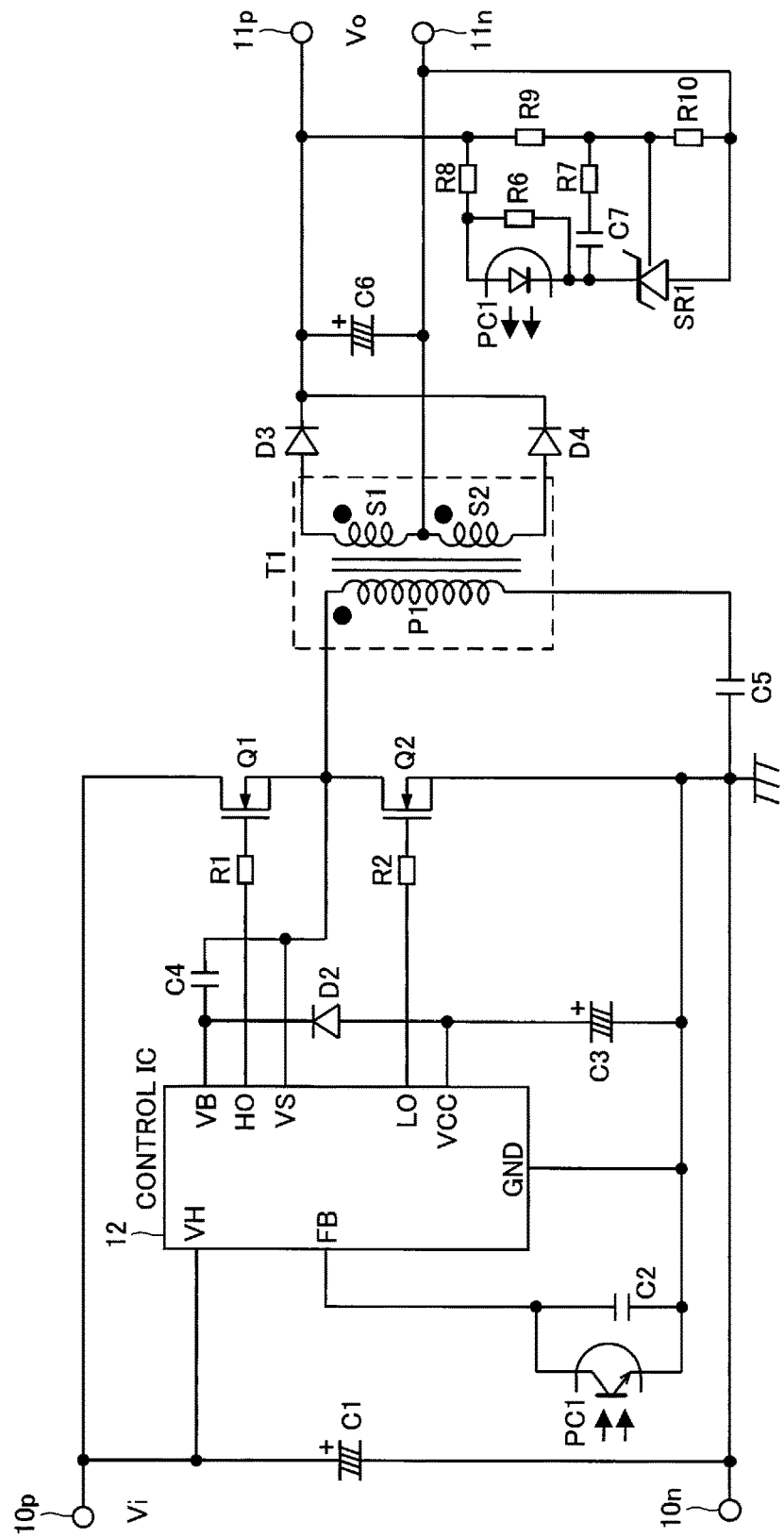
FIG. 1 is a circuit diagram illustrating a switching power supply device according to a first embodiment.
Figure 2:
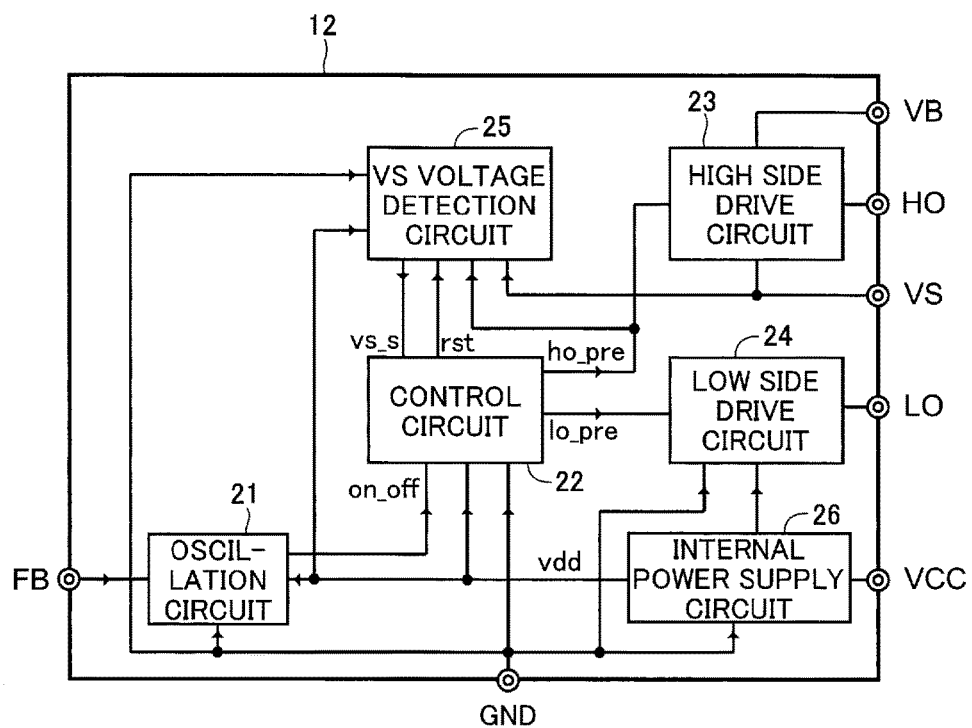
FIG. 2 illustrates an exemplary configuration of a control IC.
Figure 3:
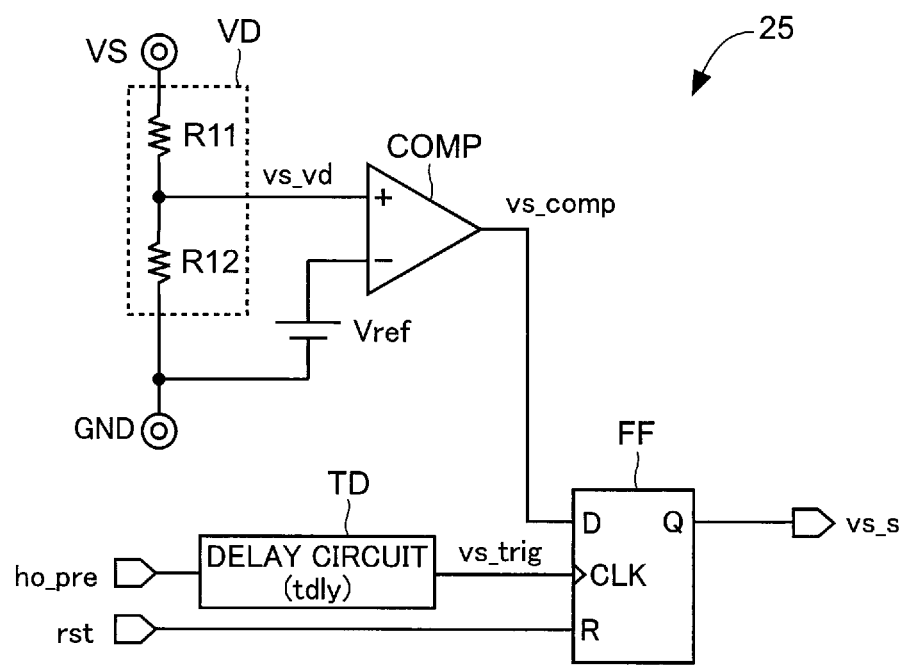
FIG. 3 illustrates an exemplary configuration of a VS voltage detection circuit.
Figure 4:
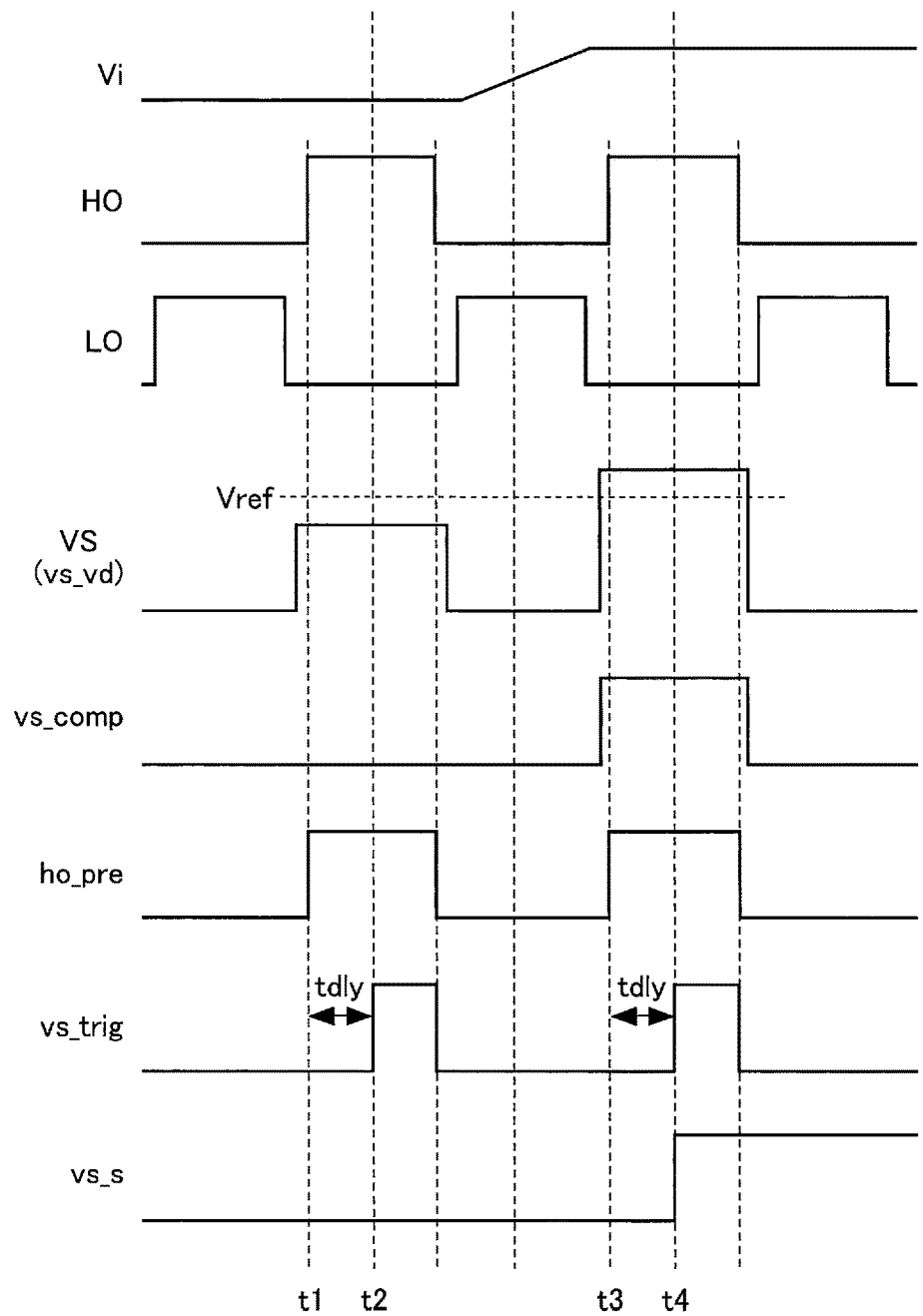
FIG. 4 is a timing chart illustrating operation of a control IC when input voltage rises.

FIG. 1 is a circuit diagram illustrating a switching power supply device according to a first embodiment. FIG. 2 illustrates an exemplary configuration of a control IC. FIG. 3 illustrates an exemplary configuration of a VS voltage detection circuit. FIG. 4 is a timing chart illustrating operation of the control IC when input voltage rises.

In the switching power supply device according to the first embodiment, input terminals 10p and 10n are connected to an input capacitor C1 and receive constant high direct-current input voltage Vi generated by a power factor correction circuit, for example. Also, a series circuit of a high side switching element Q1 and a low side switching element Q2 is connected between the input terminals 10p and 10n and composes a half bridge circuit. The switching elements Q1 and Q2 are configured with N-channel metal-oxide-semiconductor field-effect transistors (MOSFETs) in the illustrated example.

A common connection point between the switching elements Q1 and Q2 is connected to one end of a primary winding P1 of a transformer T1, and another end of the primary winding P1 is connected to a ground via a resonance capacitor C5. Here, a leakage inductance component between the primary winding P1 and secondary windings S1 and S2 of the transformer T1 and the resonance capacitor C5 compose a resonance circuit. Note that another inductance, which is different from the inductance of the transformer T1, may be connected in series to the resonance capacitor C5 and be used as a resonance reactance of the resonance circuit, instead of the leakage inductance.

One end of the secondary winding S1 of the transformer T1 is connected to an anode terminal of a diode D3, and one end of the secondary winding S2 is connected to an anode terminal of a diode D4. Cathode terminals of the diodes D3 and D4 are connected to a positive terminal of an output capacitor C6 and an output terminal 11p. A negative terminal of the output capacitor C6 is connected to a common connection point between the secondary windings S1 and S2 and an output terminal 11n. The secondary windings S1 and S2, the diodes D3 and D4, and the output capacitor C6 compose a circuit for rectifying and smoothing alternate-current voltage generated in the secondary windings S1 and S2 in order to convert the alternate-current voltage to direct-current voltage, and compose an output circuit of the switching power supply device.

The positive terminal of the output capacitor C6 is connected to an anode terminal of a light emitting diode of a photo coupler PC1 via a resistor R8, and a cathode terminal of the light emitting diode is connected to a cathode terminal of a shunt regulator SR1. A resistor R6 is connected between the anode terminal and the cathode terminal of the light emitting diode. An anode terminal of the shunt regulator SR1 is connected to the output terminal 11n. The shunt regulator SR1 includes a reference terminal that is connected to a connection point between resistors R9 and R10 connected in series between the positive terminal and the negative terminal of the output capacitor C6. A series circuit of a resistor R7 and a capacitor C7 is connected between the reference terminal and the cathode terminal of the shunt regulator SR1. The shunt regulator SR1 allows electric current according to a difference between an electric potential obtained by dividing output voltage Vo (voltage between the both ends of the output capacitor C6) and an internal reference voltage to flow in the light emitting diode. A photo transistor of the photo coupler PC1 has a collector terminal connected to an FB terminal of a control IC 12 and an emitter terminal connected to the ground, and a capacitor C2 is connected between the collector terminal and the emitter terminal.

The control IC 12 is a control unit for controlling the switching power supply device and includes a VH terminal connected to a positive terminal of the input capacitor C1 and a GND terminal connected to the ground. In addition, the control IC 12 includes an HO terminal connected to a gate terminal of the switching element Q1 via a resistor R1, an LO terminal connected to a gate terminal of the switching element Q2 via a resistor R2, as well as a VB terminal, a VS terminal, and a VCC terminal. A capacitor C4 is connected between the VB terminal and the VS terminal, and the VS terminal is connected to the common connection point between the switching elements Q1 and Q2. The VCC terminal is connected to a positive terminal of a capacitor C3, and a negative terminal of the capacitor C3 is connected to the ground. Also, the VCC terminal is connected to an anode terminal of a diode D2, and a cathode terminal of the diode D2 is connected to the VB terminal. Although not depicted to simplify the drawing, the VCC terminal is connected to an auxiliary winding of the transformer T1 via a diode, and the electric current induced in the auxiliary winding is accumulated in the capacitor C3 and is used as a power supply of the control IC 12 after the switching power supply device starts operating.

As illustrated in FIG. 2, the control IC 12 includes an oscillation circuit 21 having an input terminal connected to the FB terminal. Note that the FB terminal is pulled up to a reference voltage (not depicted) by a resistor (not depicted). An output terminal of the oscillation circuit 21 is connected to a control circuit 22 and supplies a switching signal on_off to the control circuit 22. A high side output terminal of the control circuit 22 is connected to an input terminal of a high side drive circuit 23 and supplies a high side drive signal ho_pre to the high side drive circuit 23. A low side output terminal of the control circuit 22 is connected to an input terminal of a low side drive circuit 24 and supplies a low side drive signal lo_pre to the low side drive circuit 24. An output terminal of the high side drive circuit 23 is connected to the HO terminal, and an output terminal of the low side drive circuit 24 is connected to the LO terminal. Also, the high side drive circuit 23 is connected to the VB terminal for a high side power supply and the VS terminal of a high side reference potential. Also, the VS terminal is connected to a VS voltage detection circuit 25 and supplies VS terminal voltage. The VS voltage detection circuit 25 receives the high side drive signal ho_pre and a reset signal rst from the control circuit 22, supplies a signal vs_s to the control circuit 22, and functions as an input voltage detection circuit. Note that the VS terminal is provided to supply the high side reference potential as described above.

Also, the control IC 12 includes an internal power supply circuit 26 having input terminals connected to the VCC terminal and the GND terminal. The internal power supply circuit 26 supplies low side power supply voltage to the low side drive circuit 24 and supplies voltage vdd to the oscillation circuit 21, the control circuit 22, and the VS voltage detection circuit 25. Also, the GND terminal is connected to the low side drive circuit 24, the oscillation circuit 21, the control circuit 22, and the VS voltage detection circuit 25.

As illustrated in FIG. 3, the VS voltage detection circuit 25 includes a resistor voltage dividing circuit VD, a comparator COMP, a delay circuit TD, and a D flip-flop FF.

The resistor voltage dividing circuit VD includes resistors R11 and R12 connected in series, and one end of the resistor R11 is connected to the VS terminal of the control IC 12, and one end of the resistor R12 is connected to the GND terminal of the control IC 12. This resistor voltage dividing circuit VD indirectly detects the input voltage Vi by acquiring voltage proportional to the input voltage Vi from a connection point between the resistors R11 and R12. That is, when the high side switching element Q1 turns on, the voltage of the common connection point between the switching elements Q1 and Q2 is substantially equal to the input voltage Vi, and this voltage is received by the VS terminal of the control IC 12 and the VS voltage detection circuit 25. The input voltage Vi is lowered to voltage vs_vd by dividing the input voltage Vi by a voltage division ratio which is a ratio of the resistance values of the resistors R11 and R12, and this voltage vs_vd is supplied to a non-inverting input of the comparator COMP.

The comparator COMP receives reference voltage Vref at an inverting input of the comparator COMP and compares the voltage vs_vd with the reference voltage Vref. The comparator COMP outputs a high level signal vs_comp when the voltage vs_vd is equal to or higher than the reference voltage Vref, and outputs a low level signal vs_comp when the voltage vs_vd is lower than the reference voltage Vref.

The delay circuit TD receives the high side drive signal ho_pre output from the control circuit 22 at an input terminal of the delay circuit TD, and outputs a signal vs_trig whose rising edge is delayed by a time tdly as compared with the high side drive signal ho_pre. This function of the delay circuit TD is to acquire a time point at which the high side switching element Q1 is turned on unfailingly by the high side drive circuit 23 that receives the high side drive signal ho_pre.

The flip-flop FF is a sampling circuit that receives the signal vs_comp output from the comparator COMP at the time point at which the switching element Q1 is turned on unfailingly. Hence, the flip-flop FF receives the signal vs_comp of the comparator COMP at a data input terminal of the flip-flop FF, receives the signal vs_trig of the delay circuit TD at a clock input terminal of the flip-flop FF, and receives the reset signal rst output from the control circuit 22 at a reset input terminal of the flip-flop FF. Also, the flip-flop FF outputs the sampled and held signal vs_s from an output terminal of the flip-flop FF, and this signal vs_s is input into the control circuit 22.

Next, operation of the switching power supply device of the above configuration will be described. First, the control circuit 22 of the control IC 12 receives the switching signal on_off from the oscillation circuit 21 and supplies the high side drive signal ho_pre and the low side drive signal lo_pre to the high side drive circuit 23 and the low side drive circuit 24 respectively. The high side drive circuit 23 and the low side drive circuit 24 output signals that are inverted from each other to the HO terminal and the LO terminal of the control IC 12, in order to turn on and off the switching elements Q1 and Q2 alternatingly. Thereby, the resonance circuit including the leakage inductance component of the transformer T1 and the resonance capacitor C5 performs resonance behavior to induce resonant current in the secondary windings S1 and S2 of the transformer T1, and this induced current is rectified, accumulated, and smoothed by the diodes D3 and D4 and the output capacitor C6 to become the direct-current output voltage Vo.

This output voltage Vo is detected by the shunt regulator SR1 which outputs electric current according to a difference from a predetermined value, and the difference current is returned to the FB terminal of the control IC 12 via the photo coupler PC1. In the control IC 12, the oscillation circuit 21 adjusts an oscillation frequency in accordance with the signal of the FB terminal. The current resonance DC-DC switching converter controls the oscillation frequency and thereby adjusts the electric power amount induced in the secondary side of the transformer T1, so that the output voltage Vo is controlled to a predetermined value.

Next, operation of the VS voltage detection circuit 25 of the control IC 12 will be described with reference to FIG. 4. FIG. 4 illustrates, from its top, input voltage Vi, HO terminal signal, LO terminal signal, VS terminal signal, signal vs_comp output by the comparator COMP, high side drive signal ho_pre input into the high side drive circuit 23, signal vs_trig output by the delay circuit TD, and signal vs_s output by the flip-flop FF. Note that the VS terminal signal is actually the voltage vs_vd obtained by dividing the input voltage Vi by the resistor voltage dividing circuit VD, and the reference voltage Vref indicates a threshold voltage for determining the level of the input voltage Vi (actually the voltage vs_vd).

Here, an exemplary case in which the input voltage Vi changes from low level to high level will be described. For example, at a time point t1, the high side drive circuit 23 receives the high side drive signal ho_pre of high level, and the HO terminal changes to high level to turn on the high side switching element Q1. Thereby, the VS terminal of the control IC 12 changes to voltage equivalent in level to the input voltage Vi and is input into the VS terminal of the VS voltage detection circuit 25 in the control IC 12. At this time, as the voltage vs_vd is lower than the reference voltage Vref, the comparator COMP outputs a low level signal vs_comp. Note that, in the illustrated example, the VS terminal signal rises earlier than the time point t1 at which the HO terminal signal rises. This is because, when the LO terminal signal falls to turn off the low side switching element Q2, the resonant current flowing through the primary winding P1 of the transformer T1 loses the place to go, and instead charges a parasitic capacitance associated with the connection point between the switching elements Q1 and Q2. The parasitic capacitance has a small capacitance value and thus is charged almost instantaneously to make the VS terminal voltage higher, and thereafter when the high side switching element Q1 turns on, the VS terminal voltage becomes equivalent in level to the input voltage Vi.

On the other hand, the delay circuit TD of the VS voltage detection circuit 25 receives the high side drive signal ho_pre and outputs the signal vs_trig at a time point t2 that is delayed by a predetermined time tdly. For example, the time tdly is set to an approximately half time of an ON width (¼ of a switching cycle) of the high side drive signal ho_pre, so that the signal vs_trig rises at a time point at which an approximately half time of the ON width of the high side drive signal ho_pre has elapsed. The flip-flop FF samples and holds the value of the signal vs_comp that is input into the data input terminal at the rising edge of the signal vs_trig input into the clock input terminal. At this time, the signal vs_comp is low level, and thus the flip-flop FF holds a low level value and outputs a low level signal vs_s from the output terminal. Note that this delay circuit TD has a characteristic that the signal vs_trig rises after a predetermined time has elapsed from a rising edge of the high side drive signal ho_pre and falls in synchronization with a falling edge of the high side drive signal ho_pre. Also, although not depicted, the reset signal rst is maintained at a low level, and thus reset operation of the flip-flop FF is not performed.

Next, when the input voltage Vi becomes high after the time point t2, and the voltage vs_vd obtained by dividing the input voltage Vi by the resistor voltage dividing circuit VD exceeds the reference voltage Vref, the comparator COMP outputs a high level signal vs_comp at a time point t3 at which the high side drive signal ho_pre rises.

Here, the flip-flop FF samples the value of the signal vs_comp at a time point t4 that is delayed by the time tdly from a rising edge of the high side drive signal ho_pre. At this time, the sampled signal vs_comp is at a high level, and thus the flip-flop FF holds a high level value and outputs a high level signal vs_s from the output terminal. Note that, when the reset signal rst of high level is input from the control circuit 22, the flip-flop FF is reset and outputs a low level signal vs_s from the output terminal.

As described above, the VS voltage detection circuit 25 indirectly determines, from the VS terminal voltage, whether the input voltage Vi is higher or lower than a predetermined threshold value, and outputs a binary logic signal indicating the determination result.

Note that the control IC 12 is provided with the VS terminal for the purpose of receiving the high side reference potential and thus there is no need to include a dedicated terminal to detect the input voltage Vi, thereby reducing the cost of the control IC 12. Furthermore, the circuit for detecting the input voltage Vi is not provided outside the control IC 12, but the VS voltage detection circuit 25 for detecting the input voltage Vi is integrated in the control IC 12, thereby reducing the cost of the switching power supply device.

For example, the binary logic signal obtained as described above can be used to determine whether the power supply of the switching power supply device is a 100 volt system or a 200 volt system in order to switch the function of the control IC 12 to an optimal setting for each voltage system.

<First Exemplary Variant of First Embodiment>

In the above first embodiment, the VS voltage detection circuit 25 detects the VS terminal voltage when the high side switching element Q1 turns on, as a method for indirectly detecting the input voltage Vi. However, the voltage of the VB terminal which is the power supply terminal of the high side drive circuit 23 can be used instead of the VS terminal voltage. That is, the VB terminal voltage is equal to the voltage obtained by adding the electric potential difference between the VB terminal voltage and the VS terminal voltage to the VS terminal voltage, and this electric potential difference, that is, the terminal voltage of the capacitor C4 is equal to the VCC terminal voltage. Here, the VS terminal voltage is equal to the input voltage Vi, and the VCC terminal voltage has a certain value, and thus the input voltage Vi is a value obtained by subtracting the VCC terminal voltage from the VB terminal voltage. That is, the VS voltage detection circuit 25 may set the resistor ratio of the resistor voltage dividing circuit VD and the reference voltage Vref of the comparator COMP in consideration of the VCC terminal voltage.

<Second Exemplary Variant of First Embodiment>

In the above first embodiment, the high side drive signal ho_pre is input into the delay circuit TD of the VS voltage detection circuit 25. However, as the signal input into the delay circuit TD, the VS terminal voltage can be used instead of the high side drive signal ho_pre. This is because the VS terminal voltage is obtained by turning on the high side switching element Q1 by the high side drive circuit 23 that receives the high side drive signal ho_pre.

<Second Embodiment>

Figure 5:
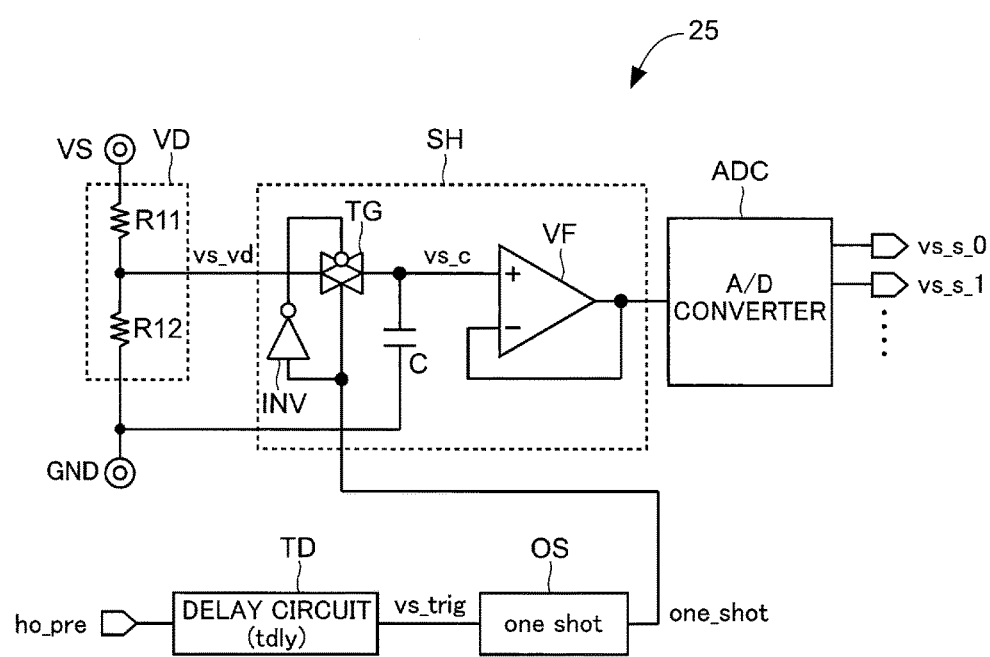
FIG. 5 illustrates an exemplary configuration of a VS voltage detection circuit in a control IC of a switching power supply device according to a second embodiment.
Figure 6:
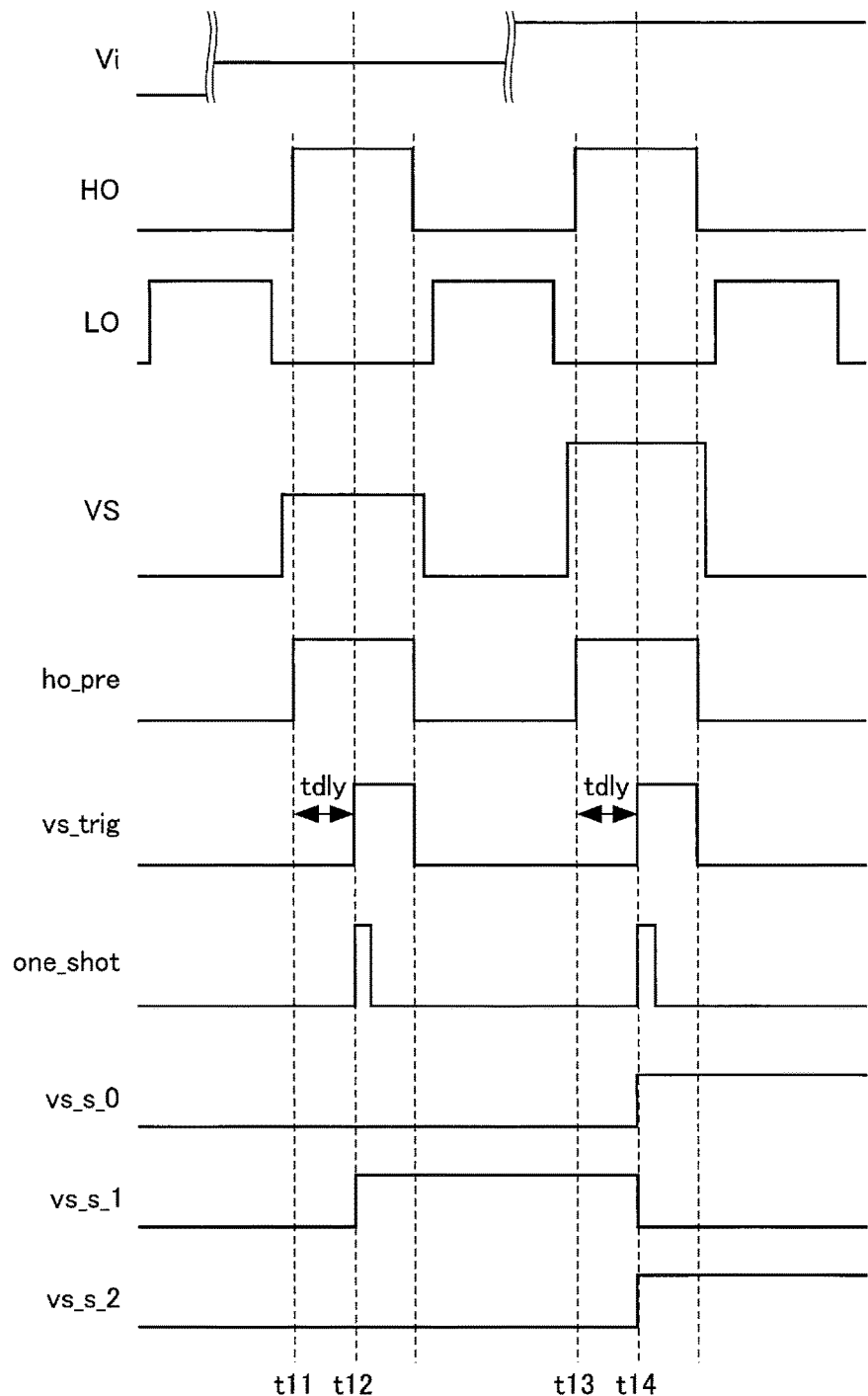
FIG. 6 is a timing chart illustrating operation of a control IC when input voltage is variable.

FIG. 5 illustrates an exemplary configuration of a VS voltage detection circuit in a control IC of a switching power supply device according to a second embodiment, and FIG. 6 is a timing chart illustrating operation of the control IC when input voltage is variable. The configurations of the switching power supply device and its control IC according to the second embodiment are the same as the configurations illustrated in FIGS. 1 and 2 and thus are not depicted in the drawings. In FIG. 5, the same or equivalent components as the components illustrated in FIG. 3 are denoted with the same reference signs.

Although the switching power supply device according to the first embodiment outputs the detection result of the input voltage Vi as a 1-bit logic signal, the switching power supply device according to the second embodiment outputs the detection result of the input voltage Vi as a multibit logic signal. Hence, the VS voltage detection circuit 25 provided in the control IC 12 as the input voltage detection circuit includes a resistor voltage dividing circuit VD, a sample-and-hold circuit SH, an analog to digital (A/D) converter ADC, a delay circuit TD, and a one-shot circuit OS, as illustrated in FIG. 5.

The resistor voltage dividing circuit VD includes resistors R11 and R12 connected in series, and one end of the resistor R11 is connected to the VS terminal of the control IC 12, and one end of the resistor R12 is connected to the GND terminal of the control IC 12. A connection point between the resistors R11 and R12 of the resistor voltage dividing circuit VD is connected to the sample-and-hold circuit SH.

The sample-and-hold circuit SH includes a transfer gate TG whose input terminal is connected to the connection point between the resistors R11 and R12 of the resistor voltage dividing circuit VD. A logical inversion gate terminal of the transfer gate TG is connected to an output terminal of an inverter INV, and another gate terminal of the transfer gate TG is connected to an input terminal of the inverter INV. An output terminal of the transfer gate TG is connected to one terminal of a capacitor C, and another terminal of the capacitor C is connected to the GND terminal. Also, the output terminal of the transfer gate TG is connected to an input terminal of a voltage follower VF, and an output terminal of the voltage follower VF is connected to an input terminal of the A/D converter ADC. Note that the transfer gate TG located between the resistor voltage dividing circuit VD and the capacitor C may be configured with other semiconductor switches.

The A/D converter ADC receives an analog signal sampled and held by the sample-and-hold circuit SH and outputs a digital signal corresponding to the analog signal. The number of output terminals of the digital signal is set according to resolution.

The delay circuit TD receives a high side drive signal ho_pre output from the control circuit 22 at an input terminal of the delay circuit TD, and outputs a signal vs_trig whose rising edge is delayed by a time tdly as compared with the high side drive signal ho_pre. An output terminal of the delay circuit TD is connected to an input terminal of the one-shot circuit OS.

An output terminal of the one-shot circuit OS is connected to the input terminal of the inverter INV of the sample-and-hold circuit SH. The one-shot circuit OS receives the signal vs_trig from the delay circuit TD and generates a signal one_shot for setting a time at which the sample-and-hold circuit SH performs sampling.

Note that, in the control IC 12 of the switching power supply device according to the second embodiment, the reset signal rst output from the control circuit 22 is unnecessary, and thus the VS voltage detection circuit 25 does not include an input terminal for inputting the reset signal rst.

Next, operation of the switching power supply device that includes the control IC 12 having the VS voltage detection circuit 25 of the above configuration will be described with reference to FIG. 6. FIG. 6 illustrates, from its top, input voltage Vi, HO terminal signal, LO terminal signal, VS terminal signal, high side drive signal ho_pre, signal vs_trig output by the delay circuit TD, signal one_shot, and signals vs_s_0 to vs_s_2 output by the A/D converter ADC. Here, the A/D converter ADC includes three output terminals and outputs 3-bit signals vs_s_0 to vs_s_2, as described above.

First, at a time point t11, the high side drive circuit 23 receives the high side drive signal ho_pre of high level, and the HO terminal changes to high level and turns on the high side switching element Q1. Thereby, the VS terminal of the control IC 12 changes to voltage equivalent in level to the input voltage Vi, and this voltage is input into the VS terminal of the VS voltage detection circuit 25 in the control IC 12. Thereby, the resistor voltage dividing circuit VD divides the input voltage Vi and outputs the voltage corresponding to the input voltage Vi.

On the other hand, the delay circuit TD of the VS voltage detection circuit 25 receives the high side drive signal ho_pre and outputs the signal vs_trig at a time point t12 that is delayed by a predetermined time tdly. Note that the length of the predetermined time tdly is the same as that in the first embodiment. This signal vs_trig is then input into the one-shot circuit OS, and the one-shot circuit OS outputs the signal one_shot when the signal vs_trig rises. This signal one_shot is applied to one of the gate terminals of the transfer gate TG of the sample-and-hold circuit SH and is applied to the other of the gate terminals via the inverter INV. Thereby, the transfer gate TG opens, so that the voltage corresponding to the input voltage Vi detected by the resistor voltage dividing circuit VD is sampled and held in the capacitor C. The voltage signal held in the capacitor C is input into the A/D converter ADC via the voltage follower VF, and the A/D converter ADC performs A/D conversion for the voltage signal held in the capacitor C and outputs the voltage signal. In the example illustrated in FIG. 6, the A/D converter ADC outputs a 3-bit digital signal [010].

Here, when the input voltage Vi becomes high, and the high side drive signal ho_pre of high level is output at a time point t13, the voltage corresponding to the input voltage Vi is sampled and held at a time point t14 that is delayed by the predetermined time tdly, in the same way. Then, the A/D converter ADC performs A/D conversion for the held voltage signal and outputs a voltage signal. In the example illustrated in FIG. 6, the A/D converter ADC outputs a digital signal [101].

The signals vs_s_0 to vs_s_2 of the A/D converter ADC obtained as described above are utilized in a circuit that needs correction according to the input voltage Vi. For example, an overcurrent protection circuit changes its detection threshold value to a lower value as the input voltage Vi becomes higher, in order to prevent the electric power to be protected from changing even when the input voltage Vi changes.

The switching power supply device of the above configuration has an advantage of reduced cost, by including the control unit that eliminates an external circuit for detecting the input voltage and an input terminal for inputting the input voltage.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply device comprising:
   a high side first switching element and a low side second switching element that are connected in series and have ends to which direct-current input voltage is applied;
   a series circuit of a resonance reactor and a resonance capacitor connected in parallel with the first switching element or the second switching element; and
   a control unit that performs on/off control to turn on and off the first switching element and the second switching element alternatingly, and includes an input voltage detection circuit for detecting a voltage that is output to a common connection point between the first switching element and the second switching element as an input voltage during a period when the first switching element is controlled to be turned on,
   wherein the input voltage detection circuit includes:
   a voltage dividing circuit connected between the common connection point between the first switching element and the second switching element and a ground;
   a comparator that binarizes an output signal of the voltage dividing circuit;
   a delay circuit that outputs a delay signal obtained by delaying a high side drive signal for turning on the first switching element by a predetermined time; and
   a flip-flop that receives a signal output by the comparator in response to the delay signal output by the delay circuit.

2. The switching power supply device according to claim 1, wherein
   the delay circuit sets a delay time of the delay signal to an approximately half time of an ON width of the high side drive signal.

3. A switching power supply device comprising:
   a high side first switching element and a low side second switching element that are connected in series and have ends to which direct-current input voltage is applied;
   a series circuit of a resonance reactor and a resonance capacitor connected in parallel with the first switching element or the second switching element; and
   a control unit that performs on/off control to turn on and off the first switching element and the second switching element alternatingly, and includes an input voltage detection circuit for detecting a voltage that is output to a common connection point between the first switching element and the second switching element as an input voltage during a period when the first switching element is controlled to be turned on, wherein the input voltage detection circuit includes:

a voltage dividing circuit connected between the common connection point between the first switching element and the second switching element and a ground;

a sample-and-hold circuit that samples and holds an output signal of the voltage dividing circuit;

an A/D converter that converts an analog signal held by the sample-and-hold circuit to a digital signal;

a delay circuit that outputs a delay signal obtained by delaying a high side drive signal for turning on the first switching element by a predetermined time; and a one-shot circuit that generates a signal for causing the sample-and-hold circuit to sample the output signal of the voltage dividing circuit, in response to the delay signal output by the delay circuit.

4. A switching power supply device comprising:

a high side first switching element and a low side second switching element that are connected in series and have ends to which direct-current input voltage is applied;

a series circuit of a resonance reactor and a resonance capacitor connected in parallel with the first switching element or the second switching element; and a control unit that performs on/off control to turn on and off the first switching element and the second switching element alternatingly, and includes an input voltage detection circuit for detecting a power supply voltage of a high side drive circuit for driving the first switching element as an input voltage during a period when the first switching element is controlled to be turned on, wherein the input voltage detection circuit includes:

a voltage dividing circuit connected between a power supply terminal of the high side drive circuit and a ground;

a comparator that binarizes an output signal of the voltage dividing circuit;

a delay circuit that outputs a delay signal obtained by delaying a high side drive signal for turning on the first switching element by a predetermined time; and a flip-flop that receives a signal output by the comparator in response to the delay signal output by the delay circuit.

* * * * *